Oct. 21, 1969  A. H. A. LASKER  3,473,464
DETACHABLE FORK ROTISSERIE ASSEMBLY
Filed June 26, 1967

INVENTOR:
ADOLPHE. H. A. LASKER.

HIS ATTYS

United States Patent Office 3,473,464
Patented Oct. 21, 1969

3,473,464
DETACHABLE FORK ROTISSERIE ASSEMBLY
Adolphe H. A. Lasker, 426 Scotia St.,
Winnipeg 17, Manitoba, Canada
Filed June 26, 1967, Ser. No. 648,594
Int. Cl. A47j 37/04
U.S. Cl. 99—421                    1 Claim

ABSTRACT OF THE DISCLOSURE

The invention consists of a pair of discs securable to a rotisserie spindle and a plurality of food-carrying tines which are held adjacent the peripheries of the discs in such a manner that they revolve with the discs yet can be removed individually without disturbing the remainder of the tines.

---

This invention relates to new and useful improvements in fork or tine units for rotisserie use.

The device is for use primarily with relatively small items of food such as kebobs and the like. It is conventional to have a single disc attachable to a rotisserie rod with a plurality of prongs or tines extending upon one or both sides of this disc upon which items such as hot dogs or kebob type of food may be placed.

The disadvantage of this single disc type of device is the fact that the individual tines carrying food cannot be removed so that the entire device has to be removed when it is desired to remove the food. While this may be satisfactory in some instances, in many other instances personal preference dictates the removal of food at different degrees of cooking. For example, small squares of steak or the like being barbecued, some people prefer such items to be rare, others medium rare, and yet others prefer them to be well done. If the relatively long forks are used upon a horizontal grill then, of course, they can be removed individually but this is not a satisfactory method of cooking such items, it being well known that rotisserie style cooking is more efficient and flavorsome.

The present device overcomes these disadvantages by providing a pair of disc attachable to a rotisserie spindle in spaced and parallel relationship. I have provided a plurality of food-carrying tines, the distal ends of which may engage an aperture adjacent the perimeter of one of the discs and the inner end may engage a slot in the perimeter and be locked in position by an extension engaging a further aperture. This means that it is locked firmly in place and can be removed individually by the operator as desired.

Another object of the invention is to provide a device of the character herewithin described in which one or a plurality of food-carrying tines can be used.

Another object of the invention is to provide a device of the character herewithin described which is adaptable for use within conventional rotisseries' spindle.

A still further object of the invention is to provide a device of the character herewithin described which is simple in construction, economical in manufacture, and otherwise well suited to the purpose for which it is designed.

With the foregoing in view, and such other objects, puposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which.

In the drawings like characters of reference indicate corresponding parts in the different figures.

Figure 1:
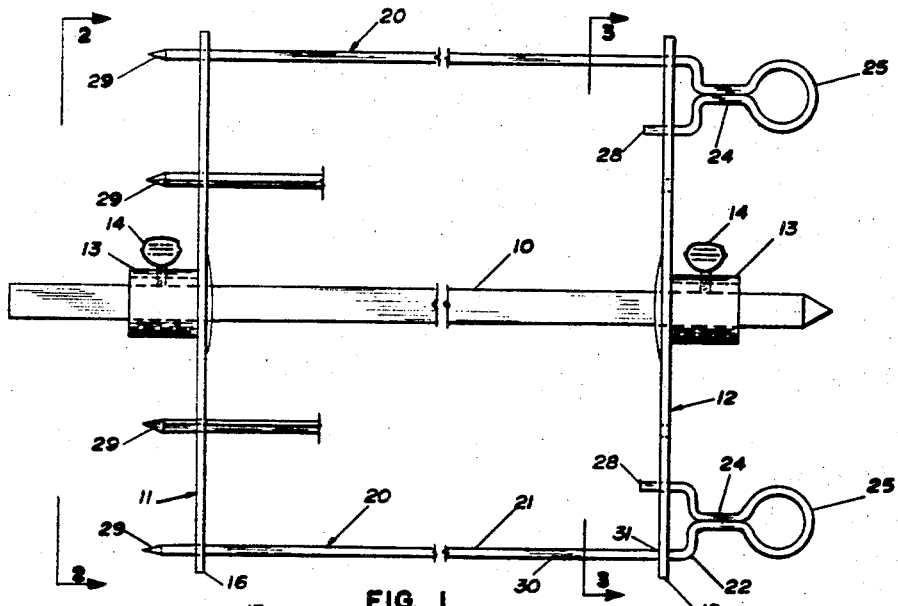
FIGURE 1 is a side elevation of the device in place upon a rotisserie spindle.
Figure 2:
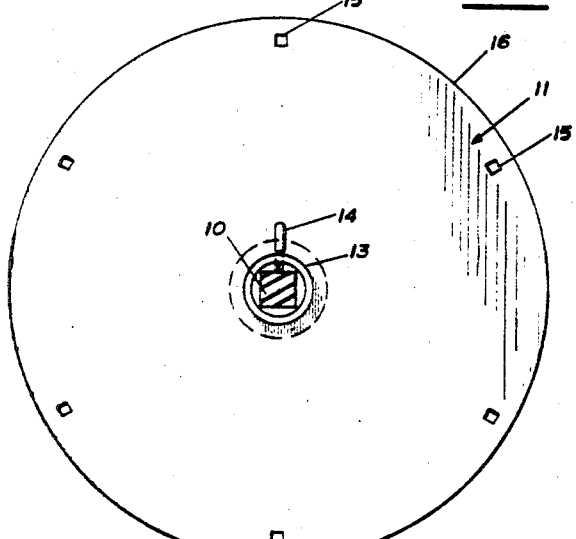
FIGURE 2 is a section along the line 2—2 of FIGURE 1.

Proceeding therefore to describe the invention in detail, reference character 10 illustrates conventional rotisserie spindle which is usually of square configuration to facilitate the engagement of food thereon.

My invention consists of a pair of discs 11 and 12 each of which is provided with a centrally located hub 13 and a thumb screw 14 screw-threadedly engageable through the wall of the hub 13. These hubs may be slid over the spindle 10 and the screws tightened thus locking the discs firmly to the shaft or spindle 10.

Disc 11 is provided with a plurality of apertures 15 formed in spaced relationship around a circle spaced just inboard from the periphery or perimeter 16 of the disc 11 and these apertures are preferably of square cross-section, but of course can be any cross sectional area.

Figure 3:
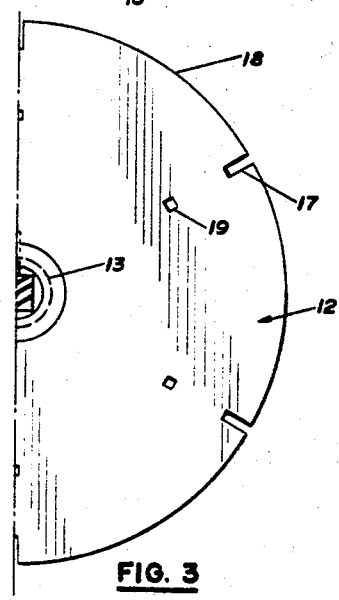
FIGURE 3 is a half section along the line 3—3 of FIGURE 1.

The other disc 12 is provided with a plurality of open-ended slots 17 extending radially inwardly from the perimeter 18 a relatively short distance as clearly shown in FIGURE 3. Inboard of these slots 17 is a plurality of corresponding apertures 19 similar to apertures 15 hereinbefore described.

Figure 4:
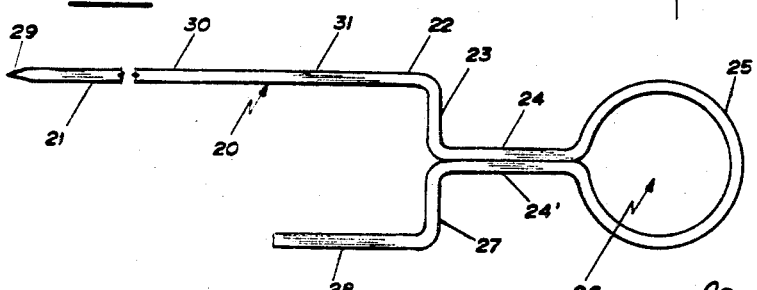
FIGURE 4 is a side elevation of one of the food-carrying tines per se.

The food-carrying units collectively designated 20 consist of an elongated food-carrying tine 21, one end 22 of which is angulated as at 23. It then angulates outwardly parallel to the main tine 21 as at 24 and is formed in a circular loop 25 as clearly shown in FIGURE 4 thus forming a handle portion collectively designated 26. The end then runs parallel to the portion 24 as indicated at 24' whereupon it angulates substantially at right angles as at 27 and then terminates in a further tine or portion 28 which is spaced and parallel to the main tine portion 21, but is only of a relatively short length as clearly shown.

In operation, the discs are secured to the spindle in spaced and parallel relationship as shown in FIGURE 1. The food is loaded upon the main tine 21 by piercing the tine therethrough whereupon the distal end 29 is engaged within one of the apertures 15 of the disc 11. The other end of the tine approximately indicated by reference character 30 is then engaged within the open-ended slot 17 and the entire tine assembly is moved towards the disc 11 so that the tine portion 28 engages the apertures 19 at which time the portion of the main tine 21 indicated by reference character 31 is engaging the open-ended slots 17. This locks the tine assembly or food unit upon the discs until it is desired to remove same at which time it is merely necessary to move the units 20 rightwardly with respect to FIGURE 1 so that the tine portion 28 disengages from the apertures 19 whereupon the units 20 can be lifted clear of the slots 17 and withdrawn from the apertures 15 without interfering with the remainder of the food-carrying units.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What I claim to be the present invention is:

1. In a rotisserie, the combination of a rotatable shaft, first and second discs mounted in axially spaced relation on said shaft for rotation therewith, the marginal edge portion of the first disc being provided with a set of circumferentially spaced rectangular apertures, the marginal edge of the second disc being provided with a set of rectangular notches axially aligned with said apertures in the first disc, said second disc also being provided at points spaced radially inwardly from said notches with rectangular openings, and a plurality of food-receiving spits individually applicable to and removable from the marginal edge portions of said discs, each of said spits being formed from rectangular wire rod and including an intermediate handle portion with a pair of straight spaced parallel end portions one of which is substantially longer than the other and is adapted to receive food thereon, said longer straight end portion of the spit being slidably received in one of the apertures in the first disc and in one of the notches in the second disc while the shorter straight end portion of the spit is slidably received in one of the openings in the second disc.

References Cited

UNITED STATES PATENTS

| | | |
|---|---|---|
| 2,649,852 | 8/1953 | McCandless. |
| 2,722,882 | 11/1955 | Wilson. |
| 2,985,096 | 5/1961 | Wolske. |
| 3,104,605 | 9/1963 | McKinney. |
| 3,196,776 | 7/1965 | Norton. |
| 3,205,812 | 9/1965 | Booth. |
| 3,329,082 | 7/1967 | Satkunas. |

WALTER A. SCHEEL, Primary Examiner

J. M. BELL, Assistant Examiner